United States Patent
Takaki

(10) Patent No.: US 10,654,475 B2
(45) Date of Patent: May 19, 2020

(54) VEHICLE CONTROL APPARATUS AND VEHICLE CONTROL METHOD

(71) Applicant: DENSO CORPORATION, Kariya, Aichi-pref. (JP)

(72) Inventor: Ryo Takaki, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 219 days.

(21) Appl. No.: 15/738,513

(22) PCT Filed: May 24, 2016

(86) PCT No.: PCT/JP2016/065301
§ 371 (c)(1),
(2) Date: Dec. 20, 2017

(87) PCT Pub. No.: WO2016/208309
PCT Pub. Date: Dec. 29, 2016

(65) Prior Publication Data
US 2018/0178786 A1 Jun. 28, 2018

(30) Foreign Application Priority Data
Jun. 26, 2015 (JP) ................................ 2015-128606

(51) Int. Cl.
*B60W 30/095* (2012.01)
*G08G 1/16* (2006.01)
(Continued)

(52) U.S. Cl.
CPC .......... *B60W 30/0956* (2013.01); *B60R 1/00* (2013.01); *G08G 1/16* (2013.01); *G08G 1/166* (2013.01);
(Continued)

(58) Field of Classification Search
CPC .......... B60W 30/095; B60W 30/0956; B60W 30/09; B60W 10/18; B60W 10/04;
(Continued)

(56) References Cited

U.S. PATENT DOCUMENTS

2013/0110323 A1* 5/2013 Knight ................... G08G 5/065
701/3
2014/0136097 A1* 5/2014 Tsuchida ............. B60W 30/095
701/301
(Continued)

FOREIGN PATENT DOCUMENTS

JP 2014-213776 A 11/2014
JP 5641271 B1 12/2014

*Primary Examiner* — Behrang Badii
(74) *Attorney, Agent, or Firm* — Knobbe, Martens, Olson & Bear, LLP

(57) ABSTRACT

Based on a detection information from a plurality of sensors detecting a surrounding object in different fashions, a vehicle control apparatus configured to perform vehicle control for avoiding or mitigating a collision with the object determines an occurrence of a detection capability impaired state in which a detection capability for detecting the object is impaired at any of sensors, based on the detection information about the sensor or the other sensors. The vehicle control apparatus shortens an actuation time until implementing the vehicle control, in comparison with a time when the sensor detects the object without causing the detection capability impaired state, if the object is detected by the sensor in which the detection capability impaired state has been eliminated within a predetermined time after determining that the detection capability impaired state has been eliminated.

12 Claims, 7 Drawing Sheets

(51) Int. Cl.
*B60R 1/00* (2006.01)
*B60T 7/12* (2006.01)
*B60R 22/00* (2006.01)
*B60T 7/22* (2006.01)

(52) U.S. Cl.
CPC ......... *B60R 22/00* (2013.01); *B60R 2300/301* (2013.01); *B60R 2300/8093* (2013.01); *B60T 7/12* (2013.01); *B60T 7/22* (2013.01); *B60W 2550/10* (2013.01); *B60Y 2300/0954* (2013.01)

(58) Field of Classification Search
CPC . B60W 2550/10; G05D 1/0088; G05D 1/101; G05D 1/102; G05D 1/0094; G05D 1/0083; G05D 1/0202; B60R 21/0134; B60R 21/017; B60R 21/0132; B60R 16/03; B60R 1/00; B60R 22/00; B60R 2300/301; B60R 2300/8093; E05F 15/43; G08G 1/165; G08G 5/065; G08G 5/045; G08G 5/0069; G08G 5/0021; G08G 1/166; G08G 5/04; G08G 1/16; G01S 13/86; G01S 7/003; G01S 15/87; G01S 13/9303; G01S 17/936; G01S 13/04; G01S 13/931; G01S 7/56; G01S 17/933; G01S 17/93; G01S 13/93; G01S 15/93; G01V 8/10; B64C 39/024; B64C 25/44; B60T 8/17558; B60T 7/22; B60T 7/12; B60J 5/101; E05C 17/006; H04N 7/181; B64D 47/08; B60Y 2300/0954
See application file for complete search history.

(56) References Cited

U.S. PATENT DOCUMENTS

| | | |
|---|---|---|
| 2014/0152488 A1 | 6/2014 | Baba |
| 2014/0324330 A1 | 10/2014 | Minemura et al. |
| 2015/0112552 A1* | 4/2015 | Okamura ............ B60R 21/0132 701/45 |
| 2015/0266456 A1* | 9/2015 | Inomata ................ G08G 1/165 701/70 |
| 2015/0375703 A1* | 12/2015 | Modi .................... B60R 21/017 307/10.1 |
| 2016/0024825 A1* | 1/2016 | Warschat ................ E05F 15/43 701/49 |
| 2016/0090085 A1 | 3/2016 | Ike |
| 2016/0125746 A1* | 5/2016 | Kunzi ................. G05D 1/0088 701/11 |
| 2017/0003390 A1 | 1/2017 | Baba |
| 2017/0225680 A1* | 8/2017 | Huang ............... B60R 21/0134 |

* cited by examiner

⊢ : CAMERA RECOGNITION POSITION
✕ : RADAR RECOGNITION POSITION

⊢ : CAMERA RECOGNITION POSITION
✕ : RADAR RECOGNITION POSITION

⊢ : CAMERA RECOGNITION POSITION
✕ : RADAR RECOGNITION POSITION

⊢ : CAMERA RECOGNITION POSITION
✕ : RADAR RECOGNITION POSITION

⊢ : CAMERA RECOGNITION POSITION
✕ : RADAR RECOGNITION POSITION

⊢ : CAMERA RECOGNITION POSITION
✕ : RADAR RECOGNITION POSITION

# VEHICLE CONTROL APPARATUS AND VEHICLE CONTROL METHOD

CROSS-REFERENCE TO RELATED APPLICATION

This application is based on and claims the benefit of priority from earlier Japanese Patent Application No. 2015-128606 filed on Jun. 26, 2015, the description of which is incorporated herein by reference.

TECHNICAL FIELD

The present disclosure relates to a vehicle control technology that detects an object around an own vehicle using a plurality of sensors and performs vehicle control depending on a collision probability between the detected object and the own vehicle.

BACKGROUND ART

A vehicle control apparatus is required to predict a collision probability between an own vehicle and an object therearound at an early stage. On the other hand, if the collision probability is not accurately predicted, this leads to increase in unnecessary vehicle control (unwanted control). In the conventional apparatus, inhibiting the unnecessary vehicle control by performing statistical processing of a trajectory of an object and thereby improving detection accuracy of an object position is known.

However, if an object appears suddenly from behind a shielding object, when performing the statistical processing for the trajectory of the object, a determination of a collision may occur too late.

In Patent Literature 1, in the state in which an object is hidden by a shielding object (hidden state), a time available for determining a collision with the object is shortened in comparison with a case in which the object has not been in the hidden state. Thereby, in Patent Literature 1, the probability of a collision with the object in the hidden state is determined more rapidly.

CITATION LIST

Patent Literature

[PLT 1] JP 2014-213776 A

SUMMARY OF THE INVENTION

Technical Problem

If a plurality of sensors detect an object, there is a possibility that a detection capability impaired state (undesirable scenario) may occur in which a detection capability for detecting the object is impaired for each sensor. The hidden state described in the conventional art can be considered as one of phenomena occurring due to an undesirable situation around the sensor.

For example, if the detection capability impaired state of a sensor has occurred, the sensor can not detect an object. In this case, it is thought that the object can be detected by the sensor, in association with the elimination of an undesirable scenario. However, depending on sensors, even if the undesirable scenario is eliminated, there is a possibility that the object cannot be detected. At this time, vehicle control is unnecessary.

Therefore, as described in Patent Literature 1, if the time available for the collision determination is shortened on the basis of only the condition that the undesirable scenario of the sensor is eliminated, unnecessary vehicle control related to the object is performed.

The purpose of the present disclosure is to provide a vehicle control apparatus that can prevent unnecessary vehicle control related to an object, and a vehicle control method that is performed by the vehicle control apparatus.

Solution to Problem

The vehicle control apparatus in the present disclosure applied to a vehicle includes a plurality of detection units (20) detecting, in different fashions, an object existing around an own vehicle (50), and implementing vehicle control for avoiding or mitigating a collision with the object based on detection information from the plurality of detection units, the vehicle control apparatus including a first determination unit, a second determination unit, and an actuation control unit. The first determination unit determines an occurrence of a detection capability impaired state in which a detection capability for detecting the object is impaired at any of the detection units among the plurality of the detection units, based on the detection information from the detection unit or the other detection units. The second determination unit determines whether or not the detection capability impaired state has been eliminated after the first determination unit determines the occurrence of the detection capability impaired state. The actuation control unit shortens an actuation time until implementing the vehicle control for avoiding or mitigating the collision, in comparison with a time when the detection unit detects the object and the detection capability impaired state has not previously occurred, if the object is detected by the detection unit in which the detection capability impaired state has been eliminated within a predetermined time after the second determination unit determines that the detection capability impaired state has been eliminated.

The vehicle control apparatus in the present disclosure shortens the actuation time until implementing the vehicle control (that is, the time available for the determination of the collision with the object), on the basis of the condition where the detection unit, in which the detection capability impaired state has been eliminated, detects the object within the predetermined time after the detection capability impaired state of the detection unit was eliminated. In particular, if the detection unit in which the detection capability impaired state has been eliminated detects the object, the vehicle control apparatus shortens the actuation time until implementing the vehicle control for avoiding or mitigating the collision to the object in comparison with the time when the detection unit detects the object without having suffered any detection capability impaired state. Thereby, the vehicle control apparatus in the present disclosure can prevent unnecessary vehicle control related to the object when the detection capability impaired state of the detection unit has been eliminated.

DESCRIPTION OF THE EMBODIMENTS

Figure 1:
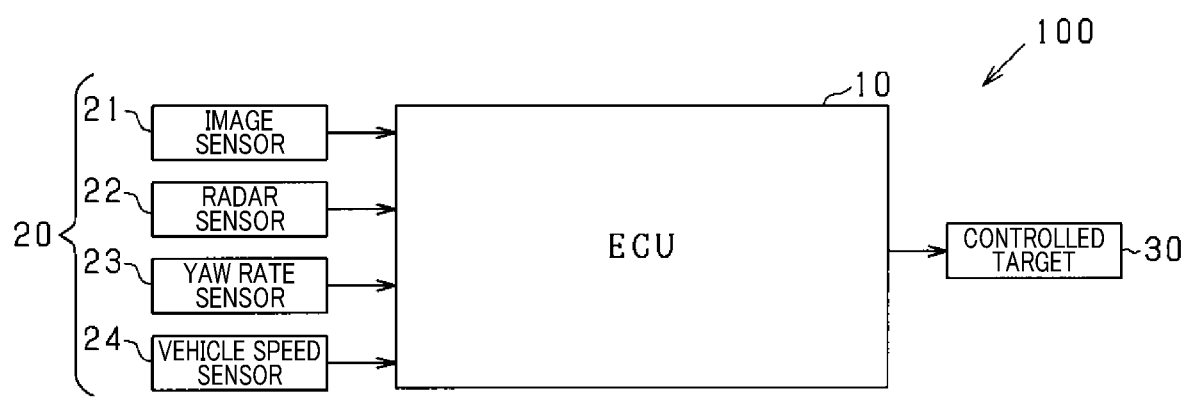
FIG. 1 is a block diagram of a vehicle control apparatus.

Embodiments will be described with reference to the drawings. In the following embodiments, the same reference numerals refer to the same or equivalent parts throughout the drawings, and further description thereof is omitted.

A vehicle control apparatus 100 according to the present embodiment is mounted in a vehicle (own vehicle), and detects an object existing around a front side and so on in a traveling detection of the own vehicle. The vehicle control apparatus 100 performs various types of controls for avoiding or alleviating a collision between the detected object and the own vehicle. In this manner, the vehicle control apparatus 100 according to the present embodiment functions as a PCS (Pre-Crash Safety system).

FIG. 1 is a block diagram of a vehicle control apparatus 100 according to the present embodiment. As illustrated in FIG. 1, the vehicle control apparatus 100 according to the present embodiment includes an ECU 10, various types of sensors 20, a controlled target 30, and so on.

The various types of sensors 20 include, for example, an image sensor 21, a radar sensor 22, a yaw rate sensor 23, a vehicle speed sensor 24, and so on. The various types of sensors 20 function as a plurality of detection units mounted in the vehicle.

The image sensor 21 is constituted with, for example, a CCD camera, a monocular camera, a stereo camera, and so on, and is provided at a predetermined height in a center portion in a width direction of the own vehicle (that is, in the vicinity of an upper side of a windshield, and so on). The image sensor 21 images a region that spreads over a range in a predetermined angle toward a front side of the own vehicle (that is, an image-capturable region) for each predetermined time, and acquires a captured image from an overhead view point. The image sensor 21 performs predetermined image processing on the captured image. Thereby, the image sensor 21 acquires, as target information, a shape (size) of the object detected in front of the own vehicle, a distance between the own vehicle and the object (that is, a relative position and a relative distance), and so on. The target information acquired by image sensor 21 is input to the ECU 10. Note that the image sensor 21 functions as a second detection unit that detects an object existing around the own vehicle by image processing of the captured image.

The image sensor 21 performs predetermined image processing such as template matching for the captured image. Thereby, the image sensor 21 identifies predetermined types of object (for example, other vehicle, pedestrian, obstruction in the road, and so on) existing within a detection range (within an angle of view). In the present embodiment, the present apparatus has a plurality of dictionary data items including an image pattern indicating the characteristics of each object (that is, image pattern data), as a template for identifying the type (kind) of each object. This dictionary data is stored in a predetermined storage area of a storage device included in the vehicle control apparatus 100. Note that the dictionary data such as entire dictionary data and partial dictionary data is stored in the storage area, wherein the entire dictionary data is data in which patterned entire characteristics of the object is stored, and the partial dictionary data is data in which partial characteristics of the object are stored. The information about the type of the object recognized by image sensor 21 is input to the ECU 10.

The radar sensor 22 detects the object in front of the own vehicle, using, for example, electromagnetic waves having directional characteristics such as millimeter waves, a laser, and so on. The radar sensor 22 is provided at a front end portion of the own vehicle. An axis of the radar is set so as to direct it in front of the own vehicle. The radar sensor 22 transmits probe waves for each predetermined time to a region that spreads over a range in a predetermined angle toward the front side of the own vehicle (that is, a detectable region), and scans the region with a radar signal. As the result, the radar sensor 22 receives electromagnetic waves reflected from a surface of an object outside the vehicle (that is, reflected waves that are reflected from the object). Based on the receiving result, the radar sensor 22 acquires the distance and the speed of the object relative to the own vehicle (that is, a relative position, a relative distance, and a relative speed) and so on, as the target information. The target information acquired by radar sensor 22 is input to the ECU 10. Note that the radar sensor 22 functions as a first detection unit that detects the object existing around the own vehicle, using the reflected waves.

The yaw rate sensor 23 detects a turning angle speed (that is, yaw rate) of the own vehicle. The vehicle speed sensor 24 detects a traveling speed of the own vehicle (that is, a vehicle speed) based on a revolution speed of the wheels. The detection results obtained by these sensors 23, 24 are input to the ECU 10.

The ECU 10 is an electronic control unit that performs control over the entirety of the vehicle control apparatus 100. The ECU 10 includes a CPU, memory (for example, ROM, RAM, and so on), I/O, and so on. The ECU 10 provides each function for vehicle control. The ECU 10 realizes each function, for example, by executing a program installed in the ROM, using the CPU. Each function included in the ECU 10 is described as follows. The ECU 10 functions as, for example, a recognition unit, recognizing an object, a determination unit, determining a collision probability with the object, a control processing unit, controlling actuation of the controlled target 30, and so on. The ECU 10 recognizes the object (for example, other vehicle, pedestrian, obstruction in the road, and so on) in front of the own vehicle, based on the information (detection results) input from the image sensor 21 and radar sensor 22. In particular, the ECU 10 fuses target information obtained from the image sensor 21 (first position information) and target information obtained from the radar sensor 22 (second position information), as a fusion object. At that time, the ECU 10 relates each item of information about objects located near each other as the position information of the same object. For example, if a position indicated in the above second position information exists near a position indicated in the above first position information, it is highly probable that the object actually exists at the position indicated in the first position information. In this manner, a state in which the image sensor 21 and radar sensor 22 acquire precisely the position of the object, is said to be a "fusion state". Thereby, the ECU 10 recognizes the object based on the fusion result. That is, the ECU 10 functions as the object recognition unit that recognizes the object by fusing a plurality of items of the position information. In addition, the ECU 10 determines whether or not the own vehicle may collide with the recognized object (that is, the collision probability). As the result, if the ECU 10 determines that the collision probability is high, the ECU 10 actuates the controlled target 30 of as a safety apparatus and so on for avoiding or mitigating the collision of the own vehicle with the object.

The controlled target 30 is, for example, a speaker, a seat belt, a brake, and so on. If the ECU 10 determines that the probability is high in which the own vehicle collides with the object, the ECU 10 performs the following controls over each of controlled target 30. For example, the ECU 10 controls the actuation of the speaker so as to transmit an alarm (that is, notify a risk) to a driver. In addition, the ECU 10 controls the actuation of the seat belt by tightening the belt, so as to protect the driver from impact in the collision. Furthermore, the ECU 10 controls the actuation of the brake so as to reduce collision speed by a braking assistance function, an automatic braking function, and so on. In this manner, the ECU 10 controls the actuation of the controlled target 30 such as the safety apparatus for avoiding or mitigating the collision of the own vehicle with the object.

In order to avoid or mitigate the collision of the own vehicle with the object, it is required to determine the collision probability between the own vehicle and the object at an early stage. On the other hand, if the collision probability is not accurately determined, this leads to increase in unnecessary vehicle control (that is, unwanted control). In the conventional apparatus, by calculating a trajectory of an object with statistical processing to improve detection accuracy of the object position, improvement of determination accuracy of the collision probability has been sought.

However, for an object in front of the own vehicle, the following status is also possible. For example, it is possible that two objects exist in front of the own vehicle. It may be assumed that one of the two objects is a moving object, and the other is a shielding object that shields the moving object. In this case, a sudden change of status may occur in which the moving object suddenly appears from behind the shielding object. In that case, when performing the statistical processing of the trajectory of the moving object, the determination of the collision probability may occur too late. In the conventional apparatus, as a case in which the moving object is hidden by the shielding object (hereinafter, referred to as a hidden state) and so on, a time available for the determination of the collision with the object is shortened in comparison with the case in which the object has not been in the hidden state. Thereby, the risk of the collision with the object in the hidden state is determined more rapidly.

On the other hand, in each of the sensors 20 used in the detection of the object, a detection capability impaired state (hereinafter, referred to as "an undesirable scenario", for convenience) may occur in which a detection capability for detecting the object is impaired depending on the characteristic. Thereby, in this undesirable scenario, if the plurality of sensors 20 detect the object, the detection capability for detecting the object is also impaired. Note that "the detection capability for detecting the object" herein means a detection accuracy when any one of the sensors 20 detects the object, a probability whether or not any one of the sensors 20 can detect the object, and so on.

For example, if the moving object is in the hidden state, the radar sensor 22 cannot detect a difference between the shielding object and the moving object. Thereby, the status in which the moving object is hidden is regarded as an undesirable scenario of the radar sensor 22. Therefore, in the undesirable scenario of the radar sensor 22, only the image sensor 21 can detect the object.

If the undesirable scenario of any of the sensors 20 is eliminated, it is thought that any of the sensors 20 can detect the object that could not be detected in the undesirable scenario. However, depending on each of the sensors 20, even if the undesirable scenario is eliminated, the object that was not detected in the undesirable scenario cannot necessarily be detected. Therefore, based on only the condition in which the undesirable scenario of any of the sensors 20 is eliminated, if the actuation time until implementing the vehicle control is shortened, the vehicle control for avoiding or mitigating the collision to the object may be performed, regardless of the low collision probability between the own vehicle and the object. That is, the conventional apparatus may perform unnecessary vehicle control related to the object.

The object with the possibility of colliding with the own vehicle has a characteristic where any of the sensors 20, in which the undesirable scenario is eliminated, detects the object immediately before the collision with the own vehicle. The vehicle control apparatus 100 according to the present embodiment shortens the time available for making the collision determination (that is, the actuation time until implementing the vehicle control), under the condition in which the object that was not detected in the undesirable scenario of any of the sensors 20 is detected in association with the elimination of the undesirable scenario of any of the sensors 20.

In particular, the vehicle control apparatus 100 shortens the time available for making the collision determination (that is, performs a time shortening processing so as the collision determination can be executed faster), if any of the sensors 20 detects the object that was not detected in the undesirable scenario (that is, before the elimination thereof), within the predetermined time after the undesirable scenario of any of the sensors 20 is eliminated. On the other hand, the vehicle control apparatus 100 does not shorten the time available for making the collision determination (that is, does not perform the time shortening processing), if any of the sensors 20 does not detect the object that was previously not detected in the undesirable scenario, within the predetermined time after the undesirable scenario of any of the sensors 20 is eliminated. In this manner, the vehicle control apparatus 100 according to the present embodiment prevents unnecessary vehicle control related to the object having the low probability of the collision with the own vehicle. Note that the value of the above "predetermined time" is a value (that is, a reference value) calculated based on, for example, experimentation and so on. This value may be preset.

In the above-mentioned example, the vehicle control apparatus 100 shortens the time available for making the collision determination, if the radar sensor 22 detects the object that was previously not detected in the undesirable scenario, within the predetermined time after the undesirable scenario of the radar sensor 22 is eliminated. That is, in the present embodiment, the vehicle control apparatus 100 performs the time shortening of the collision determination, if the radar sensor 22 detects the object that was detected by only the image sensor 21 within the predetermined time after the elimination of the undesirable scenario. On the other hand, the vehicle control apparatus 100 does not shorten the time available for making the collision determination, if the radar sensor 22 does not detect the object that was previously not detected in the undesirable scenario, within the predetermined time after the undesirable scenario of the radar sensor 22 is eliminated. That is, in the present embodiment, the vehicle control apparatus 100 does not perform the time shortening of the collision determination, if the radar sensor 22 does not detect the object that was detected by only the image sensor 21 within the predetermined time after the elimination of the undesirable scenario.

Next, the collision determination processing (the determination processing in calculating the collision determination) executed by the vehicle control apparatus 100 according to the present embodiment, is described with reference to FIG. 2. This processing is executed by the ECU 10 included in the vehicle control apparatus 100, for each predetermined period (for example, about 50 ms), which is preset.

Figure 2:
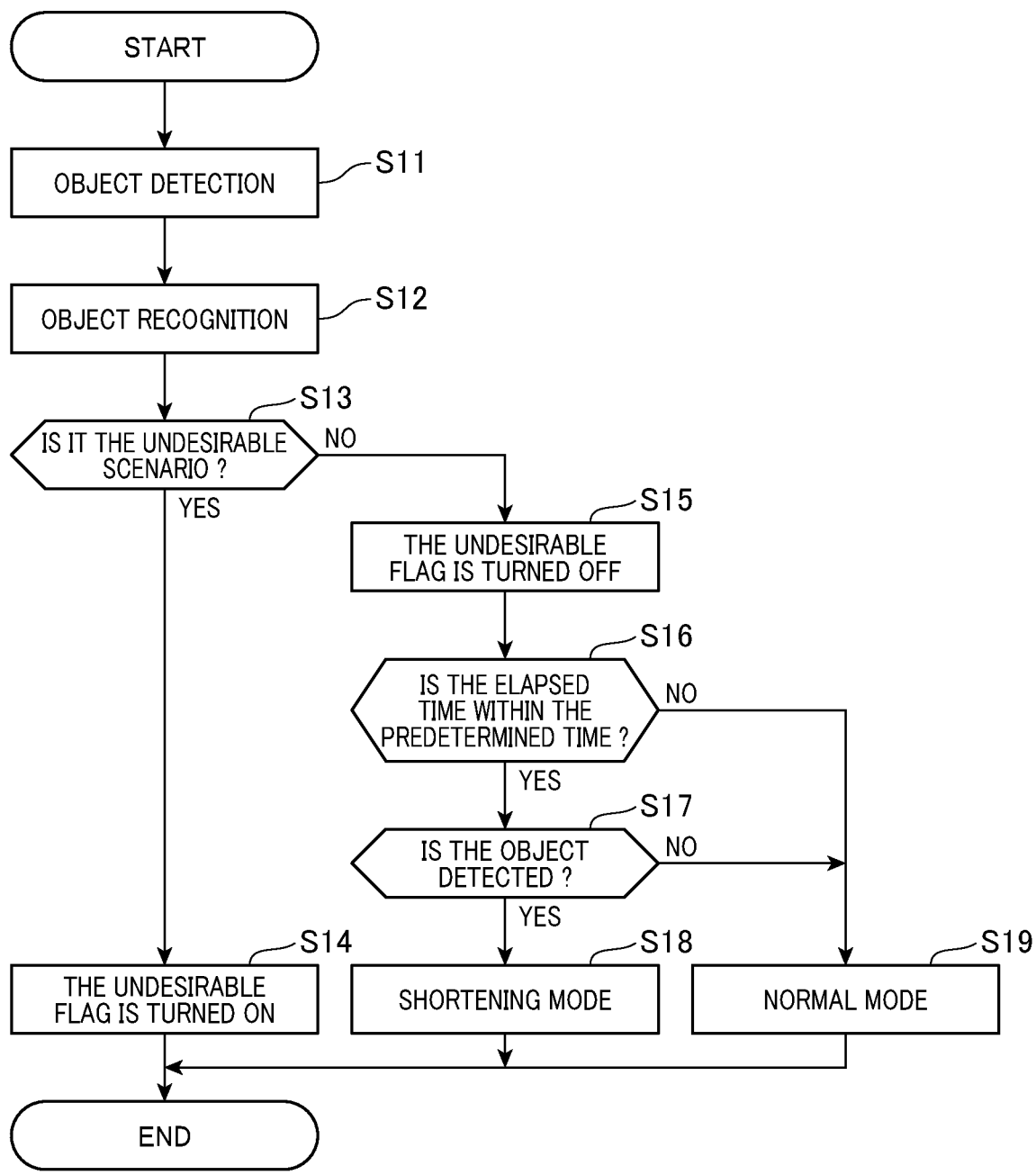
FIG. 2 is a flowchart of a collision determination processing.

In FIG. 2, the vehicle control apparatus 100 detects the object existing around the front side in the traveling detection of the own vehicle (S11). At that time, the vehicle control apparatus 100 fuses the target information obtained from the image sensor 21 and the target information obtained from the radar sensor 22, as the fusion object, and detects the object. Note that, if the target information is obtained from only either one of the image sensor 21 and the radar sensor 22, the vehicle control apparatus 100 detects the object using the target information which was obtained.

Next, the vehicle control apparatus 100 recognizes the object to be detected (S12). At that time, the vehicle control apparatus 100 performs template matching for identifying the object in the captured image, using the dictionary data such as the partial dictionary data, the entire dictionary data, and so on that are prestored in the predetermined storage area such as, for example, the ROM. Thereby, the vehicle control apparatus 100 identifies the type (kind) of the object. In addition, the vehicle control apparatus 100 links a previous recognition record of the object with a current recognition result of the object, and stores that data in the predetermined storage area such as, for example, the RAM.

Next, the vehicle control apparatus 100 determines whether or not a current detection status (that is, a detection condition) of the object is in the undesirable scenario (that is, the detection capability impaired state) (S13) of the radar sensor 22 or the image sensor 21. Note that the undesirable scenario is predefined, for each of the sensors 20. Therefore, under the predetermined detection condition, if only the image sensor 21 detects the object and if the radar sensor 22 does not detect the object, this detection condition corresponds to the condition of an undesirable scenario of the radar sensor 22. On the other hand, under the predetermined detection condition, if only the radar sensor 22 detects the object and the image sensor 21 does not detect the object, this detection condition corresponds to the condition of an undesirable scenario of the image sensor 21. In this manner, the vehicle control apparatus 100 presets the above conditions as a condition of the undesirable scenario for each of the sensors 20 (that is, an occurrence condition), and identifies the above undesirable scenario based on those settings. Note that the condition of the undesirable scenario of the radar sensor 22 or the image sensor 21 is not limited to the above conditions. For example, both the radar sensor 22 and the image sensor 21 may detect the object. If one of the results thereof is a detection result in the non-hidden state, and the other result is a detection result in the hidden state, the condition in those results may be set as the condition of the undesirable scenario of the radar sensor 22 or the image sensor 21.

If the vehicle control apparatus 100 determines the detection status as the undesirable scenario in the above determination processings (S13: YES), it turns on an undesirable flag (S14). On the other hand, if the vehicle control apparatus 100 determines the detection status as the non-undesirable scenario in the above determination processings (S13: NO), it turns off the undesirable flag (S15). Note that the "undesirable flag" herein is indicated by ON and OFF states of the flag, as to whether or not the current detection status of the object is in the undesirable scenario of any of the sensors 20, and as to whether or not the undesirable scenario has been eliminated. That is, the ECU 10 executes the processing from the steps S13 to S15, and thereby functions as a first determination unit that determines whether or not the detection status of the object is in the undesirable scenario of any of the sensors 20. In addition, the ECU 10 functions as a second determination unit that determines whether or not the undesirable scenario has been eliminated.

When the undesirable flag is turned off, the vehicle control apparatus 100 measures an elapsed time from a timing when the undesirable flag switches from ON to OFF until a present time, and determines whether or not the measured elapsed time is within the predetermined time (S16). As the result, if the vehicle control apparatus 100 determines that the elapsed time is not within the predetermined time (S16: NO), it sets the mode to a normal mode in which the time available for the determination of the collision with the object is not shortened (S19). That is, if the vehicle control apparatus 100 determines that the elapsed time exceeds the predetermined time, it sets the mode to the normal mode in which the actuation time until implementing the vehicle control is not shortened.

On the other hand, if the vehicle control apparatus 100 determines that the elapsed time is within the predetermined time (S16: Yes), it determines whether or not any of the sensors 20, in which the undesirable scenario has been eliminated, detects the object that was not detected before the elimination of the undesirable scenario (S17). That is, in this processing (S17), the vehicle control apparatus 100 determines whether or not either one of the radar sensor 22 or the image sensor 21, in which the undesirable scenario has been eliminated, detects the object that could not be detected before the elimination. As the result, if the vehicle control apparatus 100 determines that any of the sensors 20, in which the undesirable scenario has been eliminated, detects the object that was not detected before the elimination (S17: YES), the vehicle control apparatus 100 sets the mode to a shortening mode in which the time available for the determination of the collision with the object is shortened (S18). That is, if the elapsed time is within the predetermined time and if any of the sensors 20, in which the undesirable scenario has been eliminated, detects the object that was not detected before the elimination, the vehicle control apparatus 100 sets the mode to the shortening mode in which the actuation time until implementing the vehicle control is shortened. In the shortening mode according to the present embodiment, a determination criterion condition used in determining the collision probability with the object is alleviated. Thereby, in the shortening mode, the time available for the determination of the collision with the object (the time until terminating the determination) is set to be short. Note that the above determination criterion condition is, for example, a sampling number of target information used in calculating the trajectory of the object, a moving distance of the object in a transverse direction orthogonal to the traveling detection of the own vehicle, and so on. In addition, the determination criterion condition is a degree of reliability for determining whether or not these items of information have been determined as an objective target of the vehicle control. The alleviation of the above determination criterion condition represents decrease in the sampling number, for example, if the determination criterion condition corresponds to the above sampling number. The alleviation thereof represents reduction in a value of the moving distance, if the determination criterion condition corresponds to the above moving distance. In addition, the alleviation thereof represents reduction in a threshold value for determining the degree of reliability, if the determination criterion condition corresponds to the above degree of reliability. In this manner, the vehicle control apparatus 100 according to the present embodiment can shorten the time available for the determination of the collision with the object.

On the other hand, if the vehicle control apparatus 100 determines that any of the sensors 20, in which the undesirable scenario has been eliminated, detects the object that was not detected before the elimination (S17: NO), the vehicle control apparatus 100 sets the mode to the normal mode (S19). That is, if the elapsed time is within the predetermined time and if any of the sensors 20, in which the undesirable scenario has been eliminated, does not detect the object that was not detected before the elimination, the vehicle control apparatus 100 sets the mode to the normal mode in which the actuation time until implementing the vehicle control is not shortened. In this manner, the ECU 10 executes the processing from the above steps S16 to S19, and thereby functions as the actuation control unit that shortens the actuation time until implementing the vehicle control in comparison with the case in which the undesirable scenario of any of the sensors 20 does not occur.

Next, the execution examples (specific examples) of the above processings in the vehicle control apparatus 100 according to the present embodiment are described with reference to FIGS. 3A to 7.

Figure 6A:
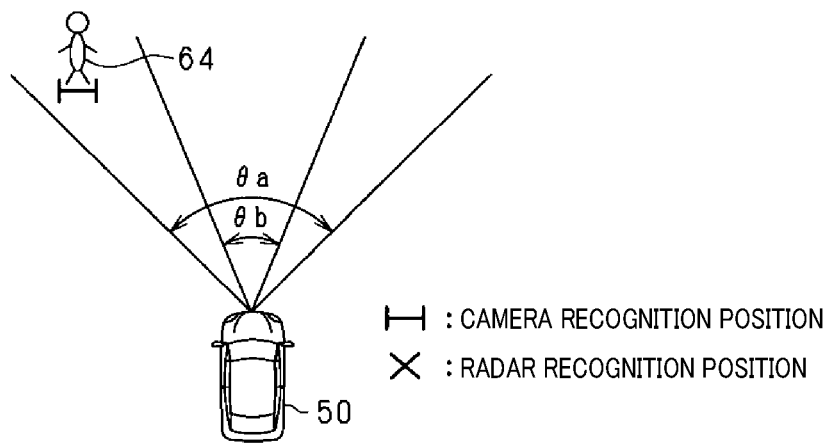
FIG. 6A is a view illustrating an execution example of a collision determination process.
Figure 6B:
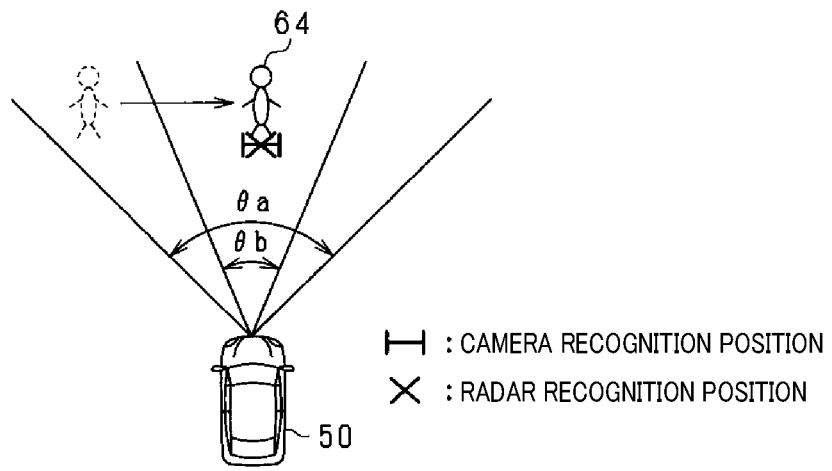
FIG. 6B is a view illustrating an execution example of a collision determination process.
Figure 7:
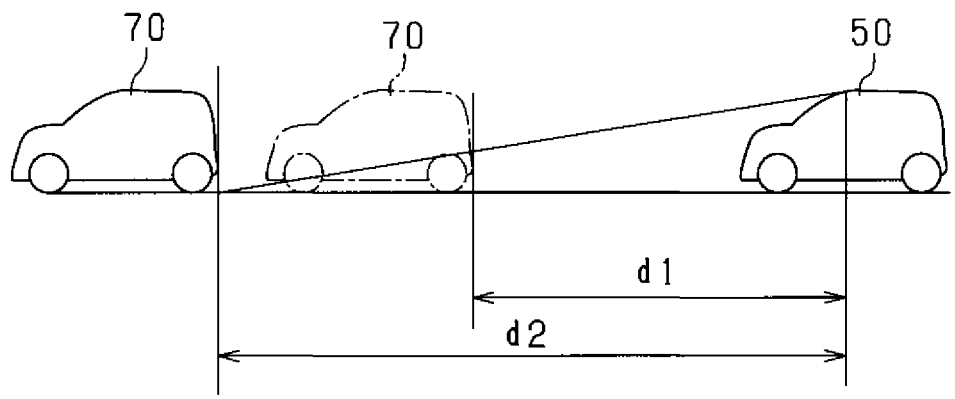
FIG. 7 is a view illustrating an execution example of a collision determination process.

FIGS. 3A to 5B are examples of undesirable scenarios occurring due to positional relationships in which the plurality of objects are close to each other. FIGS. 6A and 6B are examples of undesirable scenarios occurring due to a state in which the object exists outside a detection range of at least one sensor 20. FIG. 7 is an example of the undesirable scenario occurring due to a state in which the own vehicle approaches the object (that is, an approaching state).

<The Undesirable Scenario 1 Occurring Due to the Positional Relationship Between the Plurality of Objects>

Figure 3A:
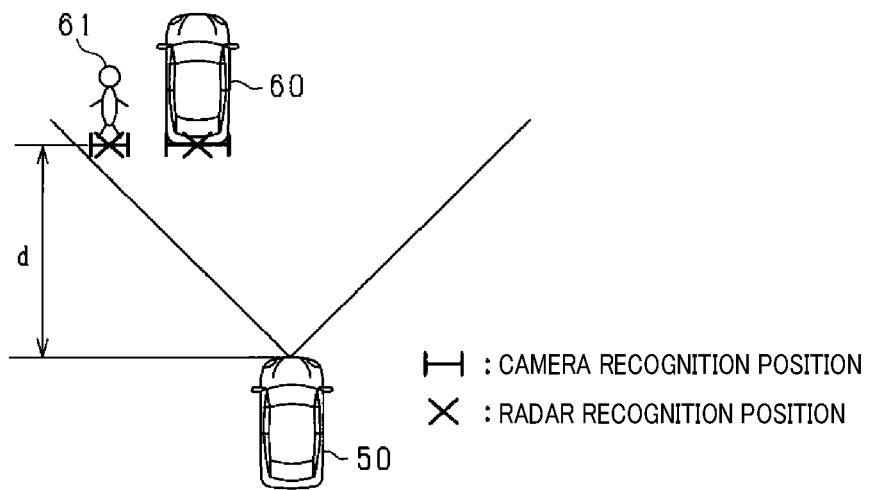
FIG. 3A is a view illustrating an execution example of a collision determination process.

In the example illustrated in FIG. 3A, a vehicle 60 stops in front of a traveling detection of an own vehicle 50, and a pedestrian 61 exists at a position having an equal distance d equal to a distance between a rear end of the vehicle 60 and a front end of the own vehicle 50. In this case, the image sensor 21 detects individually the vehicle 60 and the pedestrian 61 (using the captured image). On the other hand, it is difficult for the radar sensor 22 to detect a difference between the vehicle 60 and the pedestrian 61 (the plurality of objects) that each exist at the position having the equal distance d. In the present embodiment, the present apparatus defines the case in which the object (pedestrian 61) exists at the position having the equal distance d equal to the distance between the rear end of the vehicle 60 and the front end of the own vehicle 50 (that is, the case in which the image sensor 21 detects the object at the position having the equal distance d equal to the distance between the rear end of the vehicle 60 and the front end of the own vehicle 50), as a condition of an undesirable scenario 1 of the radar sensor 22 (that is, an occurrence condition) (Note that an undesirable scenario 1 of the radar sensor 22 is set as a situation in which the detection capability of the radar sensor 22 is impaired).

Figure 3B:
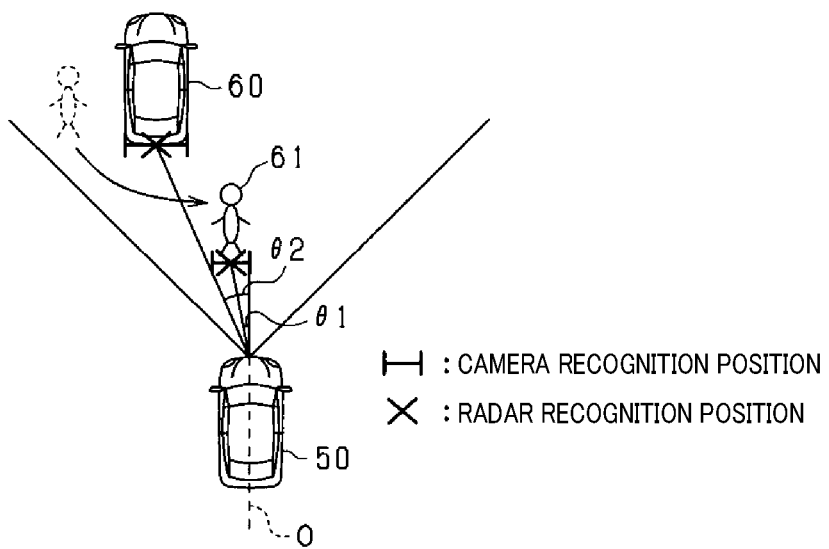
FIG. 3B is a view illustrating an execution example of a collision determination process.

In the present embodiment, the above situation is determined as an undesirable scenario 1 of the radar sensor 22. At that time, the undesirable flag is turned on. After that, under the situation that is determined as an undesirable scenario 1 of the radar sensor 22, as illustrated in FIG. 3B, if the image sensor 21 detects that the pedestrian 61 separates from the vehicle 60 (that is, if the elimination condition is satisfied), the undesirable scenario of the radar sensor 22 is eliminated. In particular, for example, if the image sensor 21 detects, using the captured image thereof, that a difference between an angle θ2 of the vehicle 60 with respect to an axle O of the own vehicle 50 and an angle θ1 of the pedestrian 61 with respect to the axle O thereof becomes a predetermined value or more (that is, the difference between θ1 and θ2 becomes a certain angle or more), the present apparatus determines that an undesirable scenario 1 of the radar sensor 22 has been eliminated. In addition, if the image sensor 21 detects that a difference between the relative distance and the relative position (lateral location) of the vehicle 60 with respect to the own vehicle 50, and the relative distance and the relative position of the pedestrian 61 with respect to the own vehicle 50 becomes the predetermined value or more (that is, the difference becomes a certain distance or more), the present apparatus may determine that an undesirable scenario 1 of the radar sensor 22 has been eliminated. In this manner, when the undesirable scenario 1 is eliminated, the undesirable flag switches from ON to OFF, in the present embodiment.

If the radar sensor 22 detects the pedestrian 61 who was not detected before the elimination within the predetermined time after an undesirable scenario 1 of the radar sensor 22 is eliminated, the present apparatus performs the determination for the collision with the pedestrian 61 in the shortening mode. On the other hand, if the radar sensor 22 does not detect the pedestrian 61 within the predetermined time after an undesirable scenario 1 is eliminated, the present apparatus performs the determination for the collision with the pedestrian 61 in the normal mode.

<The Undesirable Scenario 2 Occurring Due to the Positional Relationship Between the Plurality of Objects>

Figure 4A:
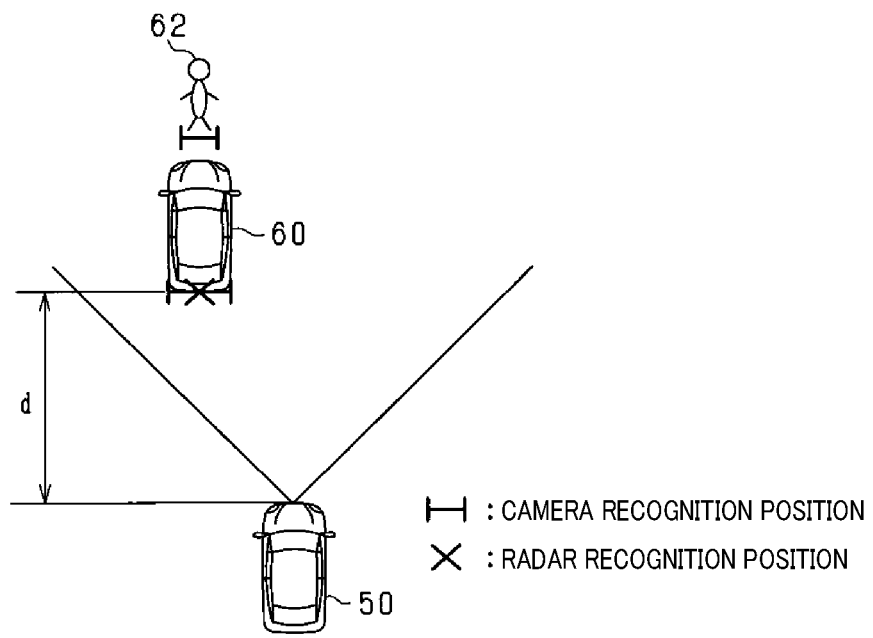
FIG. 4A is a view illustrating an execution example of a collision determination process.

In the example illustrated in FIG. 4A, the vehicle 60 stops at the position of the distance d in front of the traveling detection of the own vehicle 50, and a pedestrian 62 exists at a position around a front end of the vehicle 60 (that is, in the vicinity of the vehicle 60). That is, the pedestrian 62 is located in front of the traveling detection of the own vehicle 50 (that is, the vehicle 60 is located between the pedestrian 62 and the own vehicle 50) and has been in the hidden state. In this case, the image sensor 21 detects (using the captured image) the vehicle 60 using the image processing based on the entire dictionary data (that is, the template matching) and detects the pedestrian 62 using the image processing based on the partial dictionary data. On the other hand, it is difficult for the radar sensor 22 to detect a difference between the vehicle 60 and the pedestrian 62. In the present embodiment, the present apparatus defines the case in which the object in the hidden state (the pedestrian 62) exists due to the position of the vehicle 60 (that is, the case in which the image sensor 21 detects the object in the hidden state in front of traveling detection of the own vehicle 50), as a condition of an undesirable scenario 2 of the radar sensor 22.

Figure 4B:
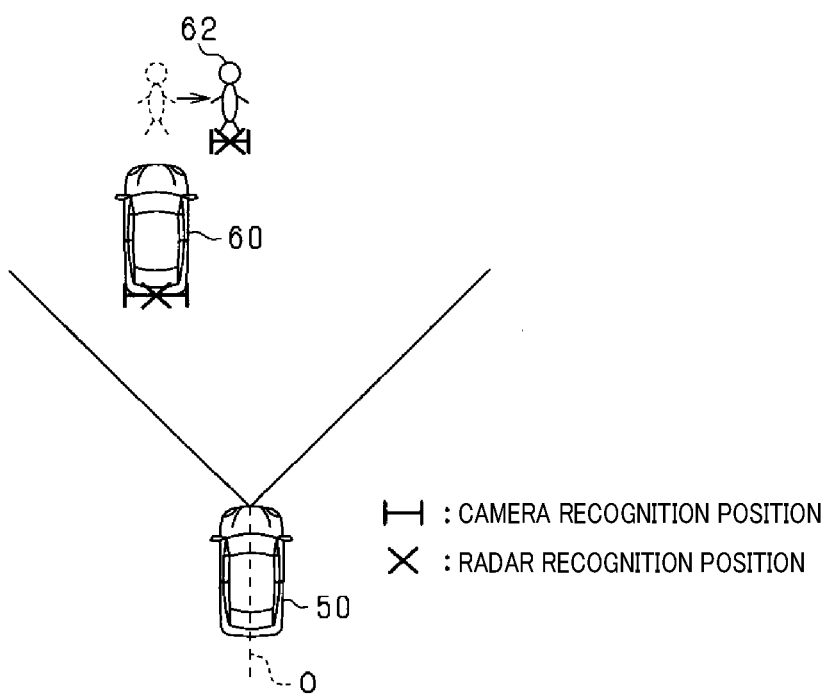
FIG. 4B is a view illustrating an execution example of a collision determination process.

In the present embodiment, the above situation is determined as an undesirable scenario 2 of the radar sensor 22. At that time, the undesirable flag is turned on. After that, under the situation that is determined as an undesirable scenario 2 of the radar sensor 22, as illustrated in FIG. 4B, if the image sensor 21 detects that the pedestrian 62 appears in front of the vehicle 60, an undesirable scenario 2 of the radar sensor 22 is eliminated. In particular, for example, if the dictionary data used in the image processing, in which the image sensor 21 performs the processing for the pedestrian 62, is switched from the partial dictionary data to the entire dictionary data, the present apparatus determines that an undesirable scenario 2 of the radar sensor 22 has been eliminated. In addition, if the image sensor 21 detects that the pedestrian 62 moves within the detection range (that is, a detectable angle) of the radar sensor 22, the present apparatus may determine that an undesirable scenario 2 of the radar sensor 22 has been eliminated. In this manner, when the undesirable scenario 2 is eliminated, the undesirable flag switches from ON to OFF, in the present embodiment.

If the radar sensor 22 detects the pedestrian 62 who was not detected before the elimination within the predetermined time after an undesirable scenario 2 of the radar sensor 22 is eliminated, the present apparatus performs the determination for the collision with the pedestrian 62 in the shortening mode. On the other hand, if the radar sensor 22 does not detect the pedestrian 62 within the predetermined time after an undesirable scenario 2 is eliminated, the present apparatus performs the determination for the collision with the pedestrian 62 in the normal mode.

<The Undesirable Scenario 3 Occurring Due to the Positional Relationship Between the Plurality of Objects>

Figure 5A:
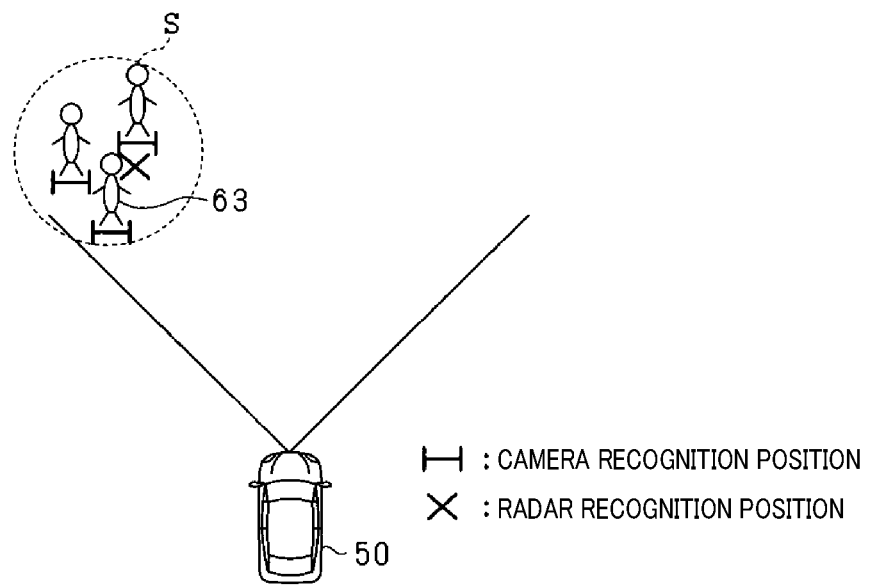
FIG. 5A is a view illustrating an execution example of a collision determination process.

In the example illustrated in the FIG. 5A, a plurality of pedestrians exist in a predetermined area S. That is, there is a crowd in front of the traveling detection of the own vehicle 50. In this case, the image sensor 21 performs the image processing based on the entire dictionary data or the partial dictionary data (using the captured image), and detects individually the plurality of pedestrians. On the other hand, it is difficult for the radar sensor 22 to detect a difference among the plurality of pedestrians. In the present embodiment, the present apparatus defines the case in which there is crowd in front of the traveling detection of the own vehicle 50 (that is, the case in which the image sensor 21 detects a plurality of pedestrians in the predetermined area S), as a condition of an undesirable scenario 3 of the radar sensor 22.

Figure 5B:
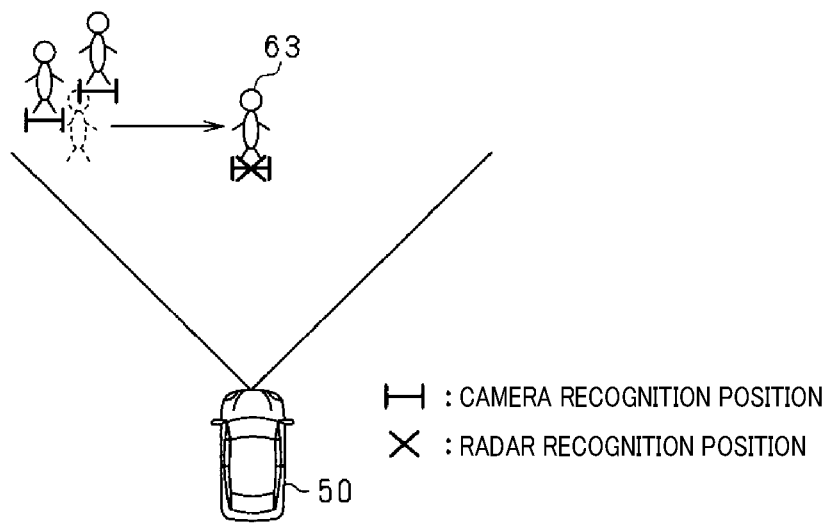
FIG. 5B is a view illustrating an execution example of a collision determination process.

In the present embodiment, the above situation is determined as an undesirable scenario 3 of the radar sensor 22. At that time, the undesirable flag is turned on. After that, under the situation that is determined as an undesirable scenario 3 of the radar sensor 22, as illustrated in FIG. 5B, if the image sensor 21 detects that at least one pedestrian 63 among the plurality of pedestrians in the predetermined area S separates from the predetermined area S, an undesirable scenario 3 of the radar sensor 22 is eliminated. In particular, for example, if the image sensor 21 detects, using the captured image thereof, that an angle between a line segment connecting the pedestrian in the predetermined area S and the own vehicle 50, and a line segment connecting the pedestrian 63 and the own vehicle 50 becomes a predetermined value or more (that is, the angle becomes a certain angle or more), the present apparatus determines that an undesirable scenario 3 of the radar sensor 22 is eliminated. In addition, if the image sensor 21 detects that a difference between the relative distance and the relative position (lateral location) of the pedestrian in the predetermined area S with respect to the own vehicle 50, and the relative distance and the relative position of the pedestrian 63 with respect to the own vehicle 50 becomes the predetermined value or more (that is, the difference becomes a certain distance or more), the present apparatus may determine that an undesirable scenario 3 of the radar sensor 22 has been eliminated. In this manner, when the undesirable scenario 3 is eliminated, the undesirable flag switches from ON to OFF, in the present embodiment.

If the radar sensor 22 detects the pedestrian 63 who was not detected before the elimination within the predetermined time after an undesirable scenario 3 of the radar sensor 22 is eliminated, the present apparatus performs the determination for the collision with the pedestrian 63 in the shortening mode. On the other hand, if the radar sensor 22 does not detect the pedestrian 63 within the predetermined time after an undesirable scenario 3 is eliminated, the present apparatus performs the determination for the collision with the pedestrian 63 in the normal mode.

<The Undesirable Scenario Occurring Due to the State in which the Object Exists Outside the Detection Range>

In the example illustrated in FIG. 6A, a different detection range is illustrated in which a detection angle θa (an angle indicating the image-capturable region) of the image sensor 21 is greater than a detection angle θb (an angle indicating the detectable region) of the radar sensor 22 (that is, θa>θb). In addition, in this example, a pedestrian 64 exists outside the detection angle θb of the radar sensor 22 (that is, outside the detection range). In this case, the image sensor 21 detects the pedestrian 63 the (using the captured image). On the other hand, the radar sensor 22 does not detect the pedestrian 64. In the present embodiment, the present apparatus defines, as the condition of an undesirable scenario of the radar sensor 22, the case in which the object exists outside the detection angle θb, that is, outside the detection range (that is, the case in which the image sensor 21 detects the object outside the detection range of the radar sensor 22) when the detection angle θa of the image sensor 21 is greater than the detection angle θb of the radar sensor 22.

In the present embodiment, the above situation is determined as an undesirable scenario of the radar sensor 22. At that time, the undesirable flag is turned on. After that, under the situation that is determined as an undesirable scenario of the radar sensor 22, as illustrated in FIG. 6B, if the image sensor 21 detects that the pedestrian 64 moves to an inside of the detection angle θb of the radar sensor 22 (that is, within the detection angle), this undesirable scenario is eliminated. In particular, for example, if the image sensor 21 detects, using the captured image thereof, that the pedestrian 64 moves transversely to the inside of the detection angle θb of the radar sensor 22, the present apparatus determines that an undesirable scenario of the radar sensor 22 has been eliminated. In addition, if the radar sensor 22 detects the pedestrian 64 existing inside the detection angle θb, the present apparatus may determine that an undesirable scenario of the radar sensor 22 has been eliminated. In this manner, when the undesirable scenario is eliminated, the undesirable flag switches from ON to OFF, in the present embodiment.

If the radar sensor 22 detects the pedestrian 64 who was not detected before the elimination within the predetermined time after an undesirable scenario of the radar sensor 22 is eliminated, the present apparatus performs the determination for the collision with the pedestrian 64 in the shortening mode. On the other hand, if the radar sensor 22 does not detect the pedestrian 64 within the predetermined time after an undesirable scenario is eliminated, the present apparatus performs the determination for the collision with the pedestrian 64 in the normal mode.

<The Undesirable Scenario Occurring Due to the State in which the Own Vehicle 50 Approaches the Object>

In the example illustrated in FIG. 7, the radar sensor 22 detects the object based on a reflection point of electromagnetic waves. Therefore, the radar sensor 22 detects a leading vehicle 70 even if the own vehicle 50 approaches the leading vehicle 70 (regardless of a distance between vehicles). On the other hand, in the case where the own vehicle 50 approaches close to the leading vehicle 70 (that is, at close range), the leading vehicle 70 (a part or an entirety of the rear end of the vehicle) may be out of the detection range (the angle of view) of the image sensor 21. For this reason, it is difficult for the image sensor 21 to detect the leading vehicle 70 by image processing based on the entire dictionary data and the partial dictionary data (using the captured image). In the present embodiment, the present apparatus defines the case in which there is an object approaching the own vehicle 50 (that is, the case where the radar sensor 22 detects the object in the approaching state in which a distance between the leading vehicle 70 and the own vehicle 50 becomes a predetermined distance or less), as the condition of an undesirable scenario of the image sensor 21 (that is, the condition in which the detection capability of the image sensor 21 is impaired).

In the present embodiment, the above situation is determined as an undesirable scenario of the image sensor 21. As illustrated in FIG. 7, for example, if the radar sensor 22 detects that the distance between the leading vehicle 70 and the own vehicle 50 becomes a first distance d1 or less (that is, the own vehicle 50 approaches the leading vehicle 70 at a certain distance), the present apparatus determines this case as an undesirable scenario of the image sensor 21. At that time, the undesirable flag is turned on. After that, under the situation that is determined as an undesirable scenario of the image sensor 21, if the radar sensor 22 detects that the distance between the leading vehicle 70 and the own vehicle 50 becomes the predetermined distance or more (that is, the own vehicle 50 separates from the leading vehicle 70 at a certain distance or more), the present apparatus determines that the undesirable scenario has been eliminated. In particular, for example, the undesirable scenario is eliminated if the radar sensor 22 detects, using a detection result thereof, that the distance between the leading vehicle 70 and the own vehicle 50 becomes a second distance d2 or more. If the leading vehicle 70 can be detected using the image processing of the image sensor 21, the present apparatus determines that an undesirable scenario of the radar sensor 22 has been eliminated. In this manner, when the undesirable scenario is eliminated, the undesirable flag switches from ON to OFF, in the present embodiment.

If the image sensor 21 detects the leading vehicle 70 that was not detected before the elimination within the predetermined time after an undesirable scenario of the image sensor 21 is eliminated, the present apparatus performs the determination for the collision with the leading vehicle 70 in the shortening mode. On the other hand, if the image sensor 21 does not detect the leading vehicle 70 within the predetermined time after an undesirable scenario is eliminated, the present apparatus performs the determination for the collision with the leading vehicle 70 in the normal mode.

The vehicle control apparatus 100 according to the present embodiment has the following excellent effects in the above configurations.

For example, in the undesirable scenario of any of the sensors 20 (that is, the detection capability impaired state), it may be assumed that the actuation time until implementing the vehicle control for avoiding or mitigating the collision with the object (that is, the time available for making the collision determination) is set to a longer time, in order to enhance the detection capability for detecting the object by the sensors 20. In this case, since delay of the determination for the collision probability occurs, an alarm output to a driver for prompting the avoidance or the mitigation of the collision with the object may be too late. The vehicle control apparatus 100 according to the present embodiment shortens the actuation time until implementing the vehicle control, if the detection status of the object is the undesirable scenario of any of the sensors 20 (for example, if the object is hidden behind the shielding object, and so on). Thereby, the vehicle control apparatus 100 according to the present embodiment can prevent lateness of the determination for the collision probability to solve the inconvenience in which the alarm output to the driver for prompting the avoidance or the mitigation of the collision with the object may be too late. However, depending on each of the sensors 20, the object that was not detected in the undesirable scenario cannot necessarily be detected in association with the elimination of the undesirable scenario. In this case, the unnecessary alarm is output to the object (that is, the unnecessary vehicle control is performed). As the result, the driver of the own vehicle 50 may feel uncomfortable with the alarm to be output.

The vehicle control apparatus 100 according to the present embodiment shortens the actuation time until implementing the vehicle control, if the following condition is satisfied within the predetermined time after the undesirable scenario of any of the sensors 20 is eliminated. In particular, the vehicle control apparatus 100 shortens the actuation time until implementing the vehicle control (that is, performs the time shortening processing), under the condition in which any of the sensors 20 detects the object that was not detected before the elimination after the elimination of the undesirable scenario. At that time, the vehicle control apparatus 100 shortens the actuation time in comparison with the time when any of the sensors 20 detects the object without having suffered any undesirable scenario. Thereby, the vehicle control apparatus 100 according to the present embodiment can prevent unnecessary vehicle control related to the object, when the undesirable scenario of any of the sensors 20 is eliminated.

The vehicle control apparatus 100 according to the present embodiment presets the condition of the undesirable scenario in any of the sensors 20 and the condition in which the undesirable scenario thereof is eliminated, that is, the elimination condition, (that is, it presets these conditions). Thereby, the vehicle control apparatus 100 according to the present embodiment can determine whether or not the current detection status of the object is the undesirable scenario and can determine whether the undesirable scenario has been eliminated, for each of the sensors 20.

For example, if there are a first object and a second object approaching each other, the image sensor 21 can detect the difference between the first object and the second object. On the other hand, since it is difficult for the radar sensor 22 to detect the difference between the first object and the second object (that is, the plurality of objects in the approaching state), the detection capability for detecting the object is impaired. The vehicle control apparatus 100 according to the present embodiment determines that the detection status of the object is the undesirable scenario of the radar sensor 22, if the image sensor 21 detects the second object approaching the first object. That is, the vehicle control apparatus 100 has a preset case in which the image sensor 21 detects the second object approaching to the first object, as a determination condition of the undesirable scenario of the radar sensor 22. After that, the vehicle control apparatus 100 determines that the undesirable scenario of the radar sensor 22 is eliminated, if the image sensor 21 detects that the approaching state is eliminated in which the second object approaches the first object (that is, each object separates at a certain distance or more). That is, the vehicle control apparatus 100 has a preset case where the image sensor 21 detects that the approaching state is eliminated in which the second object approaches the first object, as the elimination condition of the undesirable scenario of the radar sensor 22. The vehicle control apparatus 100 determines that there is the possibility in which the second object collides with the own vehicle 50, if the radar sensor 22 detects the second object that was not detected before the elimination, within the predetermined time after determining that the undesirable scenario of the radar sensor 22 is eliminated. As the result, the vehicle control apparatus 100 performs the determination for the collision with the second object in the shortening mode and shortens the actuation time until implementing the vehicle control. On the other hand, the vehicle control apparatus 100 determines that there is the low probability in which the second object collides with the own vehicle 50, if the radar sensor 22 does not detect the second object that was not detected before the elimination, within the predetermined time after determining that the undesirable scenario of the radar sensor 22 is eliminated. As the result, the vehicle control apparatus 100 performs the determination for the collision with the second object in the normal mode and does not shorten the actuation time until implementing the vehicle control. In this manner, if the undesirable scenario of the radar sensor 22 occurs due to the positional relationship between the plurality of objects, the vehicle control apparatus 100 according to the present embodiment performs the following processing. The vehicle control apparatus 100 does not shorten the actuation time until implementing the vehicle control, if both the image sensor 21 and the radar sensor 22 do not detect the second object within the predetermined time after the undesirable scenario is eliminated. Thereby, the vehicle control apparatus 100 according to the present embodiment can prevent unnecessary vehicle control related to the object with a low degree of reliability (that is, the object with the low degree of reliability in the detection accuracy), when the undesirable scenario of the radar sensor 22 is eliminated.

For example, it may be assumed that the detection angle θa of the image sensor 21 differs from the detection angle θb of the radar sensor 22, the detection angle θb of the radar sensor 22 (a first detection range) is smaller than the detection angle θa of the image sensor 21 (a second detection range), and the detection angle θb is included within the range of the detection angle θa. In this case, the image sensor 21 detects a third object, however the radar sensor 22 does not detect the third object, wherein the third object exists outside the detection angle θb (that is, outside the detection range if the radar sensor 22) and within the detection angle of the detection angle θa (that is, within the detection angle of the image sensor 21). If the image sensor 21 detects the third object existing outside the detection angle θb of the radar sensor 22, the vehicle control apparatus 100 according to the present embodiment determines that the detection status of the object is the undesirable scenario of the radar sensor 22. That is, the vehicle control apparatus 100 has a preset case in which the image sensor 21 detects the third object existing outside the detection range of the radar sensor 22, as the determination condition of the undesirable scenario of the radar sensor 22. After that, the vehicle control apparatus 100 determines that the undesirable scenario of the radar sensor 22 is eliminated, if the image sensor 21 detects the third object within the detection angle θb of the radar sensor 22. That is, the vehicle control apparatus 100 has a preset case in which the image sensor 21 detects the third object within the detection range of the radar sensor 22, as the determination condition of the undesirable scenario of the radar sensor 22. The vehicle control apparatus 100 performs the determination for the collision with the third object in the shortening mode, if the radar sensor 22 detects the third object that was not detected before the elimination, within the predetermined time after determining that the undesirable scenario of the radar sensor 22 is eliminated. As the result, the vehicle control apparatus 100 shortens the actuation time until implementing the vehicle control. On the other hand, the vehicle control apparatus 100 performs the determination for the collision with the third object in the normal mode, if the radar sensor 22 does not detect the third object that was not detected before the elimination, within the predetermined time after determining that the undesirable scenario of the radar sensor 22 is eliminated. As the result, the vehicle control apparatus 100 does not shorten the actuation time until implementing the vehicle control. In this manner, if the undesirable scenario of the radar sensor 22 occurs due to the object existing outside the detection range, the vehicle control apparatus 100 according to the present embodiment performs the following processing. The vehicle control apparatus 100 does not shorten the actuation time until implementing the vehicle control, if both the image sensor 21 and the radar sensor 22 do not detect the third object within the predetermined time after the undesirable scenario is eliminated. Thereby, the vehicle control apparatus 100 according to the present embodiment can prevent unnecessary vehicle control related to the object with the low degree of reliability (that is, the object with the low degree of reliability in the detection accuracy), when the undesirable scenario of the radar sensor 22 is eliminated.

For example, in a case where the own vehicle 50 approaches the fourth object (that is, at close range), since a part (each end on upper and lower portions, and right and left portions) of the fourth object or entirety thereof is out of the detection range of the image sensor 21, the detection capability for detecting the object of the image sensor 21 is impaired. If the radar sensor 22 detects the fourth object approaching the own vehicle 50 at the predetermined distance or less (that is, the fourth object located at the close range with respect to the own vehicle 50), the vehicle control apparatus 100 according to the present embodiment determines that the detection status of the object is the undesirable scenario of the image sensor 21. That is, the vehicle control apparatus 100 has a preset case in which the radar sensor 22 detects the fourth object approaching the own vehicle 50, as the determination condition of the undesirable scenario of the image sensor 21. After that, the vehicle control apparatus 100 determines that the undesirable scenario of the image sensor 21 is eliminated, if the radar sensor 22 detects that the approaching state is eliminated in which the fourth object approaches the own vehicle 50 (that is, each object separates at a certain distance or more). That is, the vehicle control apparatus 100 has a preset case where the radar sensor 22 detects that the approaching state is eliminated in which the fourth object approaches the own vehicle 50, as the elimination condition of the image sensor 21. The vehicle control apparatus 100 performs the determination for the collision with the fourth object in the shortening mode, if the image sensor 21 detects the fourth object that was not detected before the elimination, within the predetermined time after the undesirable scenario of the image sensor 21 is eliminated. As the result, the vehicle control apparatus 100 shortens the actuation time until implementing the vehicle control. On the other hand, the vehicle control apparatus 100 performs the determination for the collision with the fourth object in the normal mode, if the image sensor 21 does not detect the fourth object that was not detected before the elimination, within the predetermined time after the undesirable scenario of the image sensor 21 is eliminated. As the result, the vehicle control apparatus 100 does not shorten the actuation time until implementing the vehicle control. In this manner, if the undesirable scenario of the image sensor 21 occurs due to the state in which the own vehicle 50 approaches the object, the vehicle control apparatus 100 according to the present embodiment performs the following processing. The vehicle control apparatus 100 does not shorten the actuation time until implementing the vehicle control, if both the image sensor 21 and the radar sensor 22 do not detect the fourth object within the predetermined time after the undesirable scenario is eliminated. Thereby, the vehicle control apparatus 100 according to the present embodiment can prevent unnecessary vehicle control related to the object with the low degree of reliability (that is, the object with the low degree of reliability in the detection accuracy), when the undesirable scenario of the image sensor 21 is eliminated.

The vehicle control apparatus 100 in the present disclosure is not limited to the description in the above embodiment. For example, the vehicle control apparatus 100 may implement the processing as follows. Note that the same referential mark is marked in the same configuration as the above embodiment, and the detailed descriptions are omitted in the following descriptions.

In the above embodiment, the object with the possibility of colliding with the own vehicle 50 has a characteristic in which the object is detected immediately before the collision with the own vehicle (that is, a characteristic in which the entire object can be detected), in association with the elimination of the undesirable scenario of any of the sensors 20. In a modification of the above embodiment, if the undesirable scenario is eliminated, the present apparatus may shorten the time available for making the collision determination under the condition in which the image sensor 21 detects the entire object that was not detected before the elimination. Note that the determination as to whether or not the image sensor 21 detects the entire object, can be performed by the image processing (template matching) based on the entire dictionary data.

Figure 8:
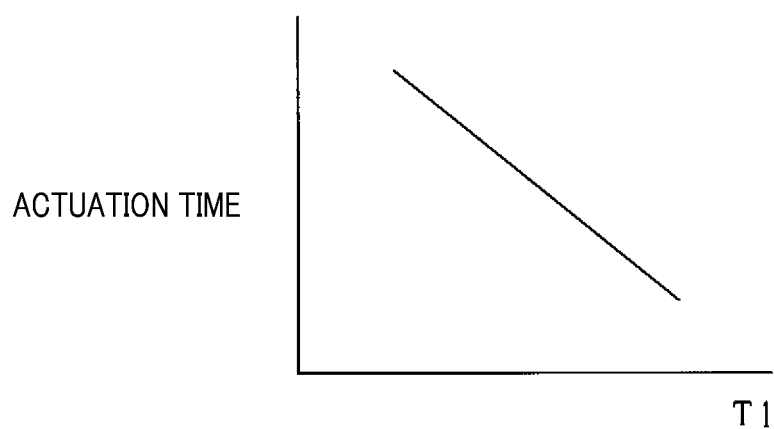
FIG. 8 is a view illustrating an example of an actuation time setting.

In a modification of the above embodiment, depending on the time available from the timing when the detection status of the object is determined as the undesirable scenario of any of the sensors 20 until the timing when it is determined that the undesirable scenario has been eliminated, the present apparatus may variably set (perform the variable setting) a rate in which the actuation time until implementing the vehicle control is shortened (that is, a shortening ratio). Additionally, in the modification, for example, the present apparatus sets the actuation time until implementing the vehicle control, as illustrated in FIG. 8. In particular, as a time T1 becomes shorter (wherein T1 is a time until the undesirable scenario of any of the sensors 20 is eliminated), the present apparatus reduces the rate at which the actuation time until implementing the vehicle control is shortened. That is, the present apparatus sets the actuation time to a long time as compared to when the time T1 is long. On the other hand, as a time T1 (the time until the undesirable scenario of any of the sensors 20 is eliminated) becomes longer, the present apparatus increases the rate at which the actuation time is shortened. That is, the present apparatus sets the actuation time to a short time as compared to when the time T1 is short. Thereby, in the modification, considering the status when the undesirable scenario of any of the sensors 20 is eliminated (that is, the positional relationship between the own vehicle 50 and the object when the undesirable scenario is eliminated), the present apparatus can properly implement the vehicle control.

In a modification of the above embodiment, depending on the elapsed time from the timing when the undesirable scenario of any of the sensors 20 is eliminated until the timing when any of the sensors 20 detects the object, the present apparatus may variably set the rate in which the actuation time until implementing the vehicle control. Additionally, in the modification, for example, the present apparatus sets the actuation time until implementing the vehicle control as follows. In particular, as the elapsed time becomes shorter, (wherein the elapsed time is a time from the timing when the undesirable scenario of any of the sensors 20 is eliminated until the timing when any of the sensors 20 detects the object), the present apparatus increases the rate at which the actuation time until implementing the vehicle control is shortened. That is, the present apparatus sets the actuation time to a relatively short time as compared to when the elapsed time is long. On the other hand, as the elapsed time becomes longer, (wherein the elapsed time is a time from the timing when the undesirable scenario of any of the sensors 20 is eliminated until the timing when any of the sensors 20 detects the object), the present apparatus reduces the rate at which the actuation time until implementing the vehicle control is shortened. That is, the present apparatus sets the actuation time to a relatively long time as compared to when the elapsed time is short. Note that after a certain time has passed from the time when the undesirable scenario of any of the sensors 20 is eliminated, the present apparatus may shorten the actuation time until implementing the vehicle control. Thereby, in the modification, considering the status in which the object is detected after the elimination of the undesirable scenario, the present apparatus can properly implement the vehicle control.

The radar sensor 22 can detect the distance to the object existing in front of in the traveling detection of the own vehicle 50, regardless of there being a small or large difference between light and dark (that is, contrast). On the other hand, if a light volume is low during the night and so on (that is, if the contrast is small), the detection capability of the image sensor 21 is impaired. Therefore, in a modification of the above embodiment, the present apparatus defines the case in which the contrast is small, as the condition of the undesirable scenario of the image sensor 21. In this case, for example, under a condition in which the detection range of the object detected by the radar sensor 22 is outside an irradiation range of a low beam (that is, a headlight for passing each other) in the own vehicle 50 and it is within an irradiation range of a high beam (that is, a headlight for travelling), the present apparatus may determine that the undesirable scenario of the image sensor 21 is eliminated. If the image sensor 21 detects the object that was not detected before the elimination within the predetermined time after the undesirable scenario of the image sensor 21 is eliminated, the present apparatus performs the determination for the collision with the object in the shortening mode.

In the above embodiment, if the detection angle of the radar sensor 22 (detection angle θb) is greater than the detection range of the image sensor 21 (detection angle θa), the image sensor 21 cannot detect the object existing outside the detection range of the image sensor 21 (that is, outside the detection angle θa). Therefore, in a modification of the above embodiment, the present apparatus defines the case with the radar sensor 22 detects the object existing outside the detection range of the image sensor 21, as the condition of the undesirable scenario of the image sensor 21. In this case, for example, under a condition in which the objects moves within the detection range of the image sensor 21, based on changes of a vehicle speed of the own vehicle 50, a moving speed of the object (for example, a pedestrian and so on), or the like, the present apparatus may determine that the undesirable scenario of the image sensor 21 is eliminated.

For example, it may be assumed that a plurality of large vehicles (trucks and so on) run parallel to each other, in front of the travelling direction of the own vehicle 50, on a road with a plurality of lanes each way. Moreover, it is possible that a small vehicle (for example, a light automobile, two-wheel vehicle, or the like) may exist between large vehicles, and the small vehicle is located at a position equal to a distance between a rear end of the large vehicle and a front end of the small vehicle. In this case, it is difficult for the radar sensor 22 to detect a difference between the large vehicle and the small vehicle. Therefore, in a modification of the above embodiment, the present apparatus defines this case, as the condition of the undesirable scenario of the radar sensor 22. In this case, for example, under the condition in which a difference between the relative distance and the relative position (lateral location) of the large vehicle with respect to the own vehicle 50, and the relative distance and the relative position of the small vehicle with respect to the own vehicle 50 becomes the predetermined value or more (that is, the difference becomes a certain distance or more), the present apparatus may determine that the undesirable scenario of the radar sensor 22 is eliminated. If the radar sensor 22 detects the vehicle that was not detected before the elimination within the predetermined time after determining that the undesirable scenario of the radar sensor 22 is eliminated, the present apparatus performs the determination for the collision with the vehicle in the shortening mode. On the other hand, if the radar sensor 22 does not detect the vehicle that was not detected before the elimination within the predetermined time after determining that the undesirable scenario is eliminated, the present apparatus performs the determination for the collision with the vehicle in the normal mode.

For example, it may be assumed that an object which is a pedestrian or the like exists near a guard rail (that is, a crash barrier) and a space is narrow between the guard rail and the object. In this case, it may be difficult for the radar sensor 22 to detect a difference between the guard rail and the object. Therefore, in a modification of the above embodiment, the present apparatus defines this status, as the condition of the undesirable scenario of the radar sensor 22. In this case, for example, under the condition in which the pedestrian crosses over the guard rail and then moves on the travelling road, and the space between the guard rail and the object is separated at the predetermined space or more (that is, the space becomes a certain distance or more), the present apparatus may determine that the undesirable scenario of the radar sensor 22 is eliminated. If the radar sensor 22 detects the pedestrian who was not detected before the elimination within the predetermined time after determining that the undesirable scenario of the radar sensor 22 is eliminated, the present apparatus performs the determination for the collision with the pedestrian in the shortening mode. On the other hand, if the radar sensor 22 does not detect the pedestrian who was not detected before the elimination within the predetermined time after determining that the undesirable scenario is eliminated, the present apparatus performs the determination for the collision with the pedestrian in the normal mode. As well, in the modification, under the condition in which the radar sensor 22 detects the pedestrian who was not detected before the elimination within the predetermined time after determining that the undesirable scenario is eliminated and in which the detected pedestrian moves in a direction approaching to the own vehicle 50, the present apparatus may shorten the time available for making the collision determination.

In a modification of the above embodiment, each processing in the above descriptions can also be applied to a case in which the object in front of the traveling detection of the own vehicle 50 is an automobile. As well, if the object is the automobile, the radar sensor 22 may not detect the automobile, due to the low tracking accuracy caused by a high moving speed of the automobile. Therefore, in the modification, the image sensor 21 detects the automobile, and the present apparatus defines a case in which the moving speed of the detected automobile becomes a predetermined speed or more, as the condition of the undesirable scenario of the radar sensor 22. In this case, for example, under a condition in which the moving speed of the automobile becomes a value less than the predetermined speed, the present apparatus may determine that the undesirable scenario of the radar sensor 22 is eliminated.

The radar sensor 22 is set to the undesirable scenario in which the detection capability for detecting the object is impaired, if the distance to the object has been in a close range (for example, less than two meters). In a modification of the above embodiment, the sensors 20 such as a sonar or a laser that can detect an object located at a range very much closer than the radar sensor 22 are mounted in the own vehicle 50. In the modification, the present apparatus defines the case in which any of the sensors 20 (that can detect the object in the close range) detects the object that was not detected by the radar sensor 22, as the condition of the undesirable scenario of the radar sensor 22.

If the image sensor 21 is a monocular camera, the image sensor 21 cannot capture, for example, the pedestrian existing near the guard rail. On the other hand, the radar sensor 22 can detect the guard rail from a line of the object with a predetermined reflection intensity. In a modification of the above embodiment, the present apparatus defines the case in which the radar sensor 22 detects the guard rail, as the condition of the undesirable scenario of the monocular camera (image sensor 21). In the modification, under a condition in which the monocular camera detects the pedestrian and the detected pedestrian moves toward the travelling road, the present apparatus determines that the undesirable scenario of the monocular camera is eliminated. In this case, in the modification, if the monocular camera detects the pedestrian using the image processing based on the entire dictionary data within the predetermined time after determining that the undesirable scenario of the monocular camera is eliminated, the present apparatus shortens the time available for making the collision determination. On the other hand, if the monocular camera does not detect the pedestrian, the present apparatus does not shorten the time available for making the collision determination.

In a modification of the above embodiment, depending on the type (kind) of the detected object when the undesirable scenario of any of the sensors 20 is eliminated, the present apparatus may set the mode to the shortening mode or the normal mode. In particular, for example, if the object (which is detected within the predetermined time after determining that the undesirable scenario of any of the sensors 20 is eliminated) is a pedestrian, a vehicle, or the like, the present apparatus sets the mode to the shortening mode in which the actuation time until implementing the vehicle control is shortened. That is, the object (which is detected within the predetermined time after determining that the undesirable scenario of any of the sensors 20 is eliminated) is a stationary body of a manhole or the like, the present apparatus sets the mode to the normal mode in which the actuation time until implementing the vehicle control is not shortened.

In a modification of the above embodiment, depending on the type of the object, the present apparatus may change a determination threshold value used in the determination as to whether or not the undesirable scenario is eliminated. In particular, if the moving speed of the object (for example, the two-wheel vehicle) is faster than that of the pedestrian, the present apparatus sets the determination threshold value to a small value, and sets the determination criterion to a low level. In addition, for example, in case of the pedestrian, when the detection is performed by the image processing based on the entire dictionary data, the present apparatus determines that the undesirable scenario is eliminated. On the other hand, in case of the two-wheel vehicle, when the detection is performed by the image processing based on the partial dictionary data, the present apparatus may determine that the undesirable scenario is eliminated. In this manner, in the modification, depending on the type of the object, the present apparatus can determine properly the elimination of the undesirable scenario of any of the sensors 20.

In a modification of the above embodiment, depending on the type of the object detected when the undesirable scenario of any of the sensors 20 is eliminated, the present apparatus may variably set the rate in which the actuation time until implementing the vehicle control is shortened (that is, the shortening ratio). In particular, if the moving speed of the object (for example, the two-wheel vehicle) is faster than that of the pedestrian, the present apparatus increases the rate thereof, and sets the setting so as to shorten the actuation time more. In this manner, in the modification, depending on the type of the object detected in association with the elimination of the undesirable scenario of any of the sensors 20, the present apparatus can perform the vehicle control in a more proper timing.

A modification of the above embodiment may include at least three sensors (that is, at least three of the sensors 20 that detect the object existing around the vehicle in the respective different fashions). In particular, for example, the own vehicle 50 may include the image sensor 21 and the radar sensor 22 as well as the sonar and so on, in the configuration of thereof.

In above description, if any of the sensors 20 detects the object that was not detected before the elimination within the predetermined time after determining that the undesirable scenario of any of the sensors 20 is eliminated, the present apparatus shortens the actuation time until implementing the vehicle control. Note that the above predetermined time may be variably set depending on the type of the undesirable scenario or the type of the object. That is, in the modification, the ECU 10 may function as a setting portion that variably sets the predetermined time. In particular, for example, the predetermined time is set to a different value in each undesirable scenario occurring due to each positional relationship between the plurality of objects in the above description. In addition, for each of the case in which the object is the own vehicle 50 and the case in which the object is the pedestrian, the present apparatus sets each predetermined time, in these cases, to a different value.

In above description, if any of the sensors 20 detects the object that was not detected before the elimination within the predetermined time after determining that the undesirable scenario of any of the sensors 20 is eliminated, the present apparatus shortens the actuation time until implementing the vehicle control. However, the present invention is not limited to this case. As another example, under the condition in which any of the sensors 20 detects the object that was not detected before the elimination at the time point when the undesirable scenario of any of the sensors 20 is eliminated, the present apparatus may shorten the actuation time until implementing the vehicle control.

REFERENCE SIGNS LIST

10 . . . ECU
21 . . . Image sensor
22 . . . Radar sensor
50 . . . Own vehicle
100 . . . Vehicle control apparatus

The invention claimed is:

1. A vehicle control apparatus applied to a vehicle including a plurality of detection units detecting, in different fashions, an object existing around an own vehicle, and implementing vehicle control for avoiding or mitigating a collision with the object based on detection information from the plurality of detection units, the vehicle control apparatus comprising:

a first determination unit that determines an occurrence of a detection capability impaired state in which a detection capability for detecting the object is impaired at any of the detection units among the plurality of the detection units based on the detection information from the detection unit or the other detection units;

a second determination unit that determines whether or not the detection capability impaired state has been eliminated after the first determination unit determines the occurrence of the detection capability impaired state; and an actuation control unit that shortens an actuation time until implementing the vehicle control for avoiding or mitigating the collision, in comparison with a time when the detection unit detects the object and the detection capability impaired state has not previously occurred, if the object is detected by the detection unit in which the detection capability impaired state has been eliminated within a predetermined time after the second determination unit determines that the detection capability impaired state has been eliminated, and not shortening the actuation time, if the object is not detected by the detection unit in which the detection capability impaired state has been eliminated within the predetermined time after the second determination unit determines that the detection capability impaired state has been eliminated.

2. The vehicle control apparatus according to claim 1, wherein, under a state in which the plurality of the detection units detects the object, the vehicle control apparatus defines a condition of the detection capability impaired state caused on the detection unit for each of the detection units, and an elimination condition by which the detection capability impaired state is eliminated,
the first determination unit determines the occurrence of the detection capability impaired state, if the condition of the detection capability impaired state for each of the detection units is satisfied, and
the second determination unit determines that the detection capability impaired state has been eliminated if the elimination condition is satisfied.

3. The vehicle control apparatus according to claim 2, wherein the actuation control unit variably sets a shortening ratio of the actuation time depending on a time from a timing when the first determination unit determines that the detection unit has been in the detection capability impaired state until a timing when the second determination unit determines that the elimination condition is satisfied.

4. The vehicle control apparatus according to claim 2, wherein the actuation control unit variably sets the shortening ratio of the actuation time depending on a time from the timing when the second determination unit determines that the elimination condition is satisfied and then the detection capability impaired state is eliminated until a timing when the object is detected by the detection unit in which the detection capability impaired state is eliminated.

5. The vehicle control apparatus according to claim 2, wherein the actuation control unit variably sets the shortening ratio of the actuation time depending on a type of the object to be detected, at the time from the timing when the second determination unit determines that the elimination condition is satisfied and then the detection capability impaired state is eliminated until the timing when the object is detected by the detection unit in which the detection capability impaired state is eliminated.

6. The vehicle control apparatus according to claim 1, comprising:
   a first detection unit that detects the object around the own vehicle by a reflected wave; and
   a second detection unit that detects the object around the own vehicle by an image processing of a captured image, as the plurality of the detection units, wherein,
   the first determination unit determines that the first detection unit has been in the detection capability impaired state if a first object and a second object both having been in an approaching state are detected by the image processing of the second detection unit,
   the second determination unit determines that the detection capability impaired state of the first detection unit has been eliminated if it is detected that the approaching states of the first object and the second object are eliminated by the image processing of the second detection unit, and
   the actuation control unit shortens the actuation time if the first detection unit detects the second object within the predetermined time after determining that the detection capability impaired state of the first detection unit has been eliminated, and does not shorten the actuation time if the first detection unit does not detect the second object within the predetermined time.

7. The vehicle control apparatus according to claim 6, wherein,
   if a first detection range in which the first detection unit can detect the object differs from a second detection range in which the second detection unit can detect the object, and if the first detection range is included within the second detection range,
   the first determination unit determines that the first detection unit has been in the detection capability impaired state if the second detection unit detects a third object outside the first detection range,
   the second determination unit determines that the detection capability impaired state of the first detection unit has been eliminated if the second detection unit detects the third object within the first detection range, and
   the actuation control unit shortens the actuation time if the first detection unit detects the third object within the predetermined time after determining that the detection capability impaired state of the first detection unit has been eliminated, and does not shorten the actuation time if the first detection unit does not detect the third object within the predetermined time.

8. The vehicle control apparatus according to claim 6, wherein
   the first determination unit determines that the second detection unit has been in the detection capability impaired state if the first detection unit detects a fourth object locating in a short distance with respect to the own vehicle and having been in an approaching state with respect thereto,
   the second determination unit determines that the detection capability impaired state of the second detection unit is eliminated if the first detection unit detects that a distance between the own vehicle and the fourth object is separated by a predetermined distance or more, and
   the actuation control unit shortens the actuation time if the second detection unit detects the fourth object within the predetermined time after determining that the detection capability impaired state of the second detection unit has been eliminated, or does not shorten the actuation time if the second detection unit does not detect the fourth object within the predetermined time.

9. The vehicle control apparatus according to claim 6, comprising an object recognition unit that recognizes the object by fusing position information about the object acquired by the first detection unit and by the second detection unit.

10. The vehicle control apparatus according to claim 1, wherein the actuation control unit sets the actuation time to be short under a condition where the object is detected by the detection unit in which the detection capability impaired state is eliminated, at a time point when the second determination unit determines that the detection capability impaired state is eliminated.

11. The vehicle control apparatus according to claim 1, comprising a setting unit that variably sets the predetermined time depending on a type of the detection capability impaired state or the type of the object.

12. A vehicle controlling method performed by a vehicle control apparatus applied to the vehicle including a plurality of detection units detecting, in different fashions, an object existing around an own vehicle, and implementing vehicle control for avoiding or mitigating a collision with the object based on detection information from the plurality of detection units, the method comprising:
   a first determination step of determining an occurrence of a detection capability impaired state in which a detection capability for detecting the object is impaired at any of the detection units among the plurality of the detection units based on the detection information about the detection unit or the other detection units;
   a second determination step of determining whether or not the detection capability impaired state has been eliminated after the occurrence of the detection capability impaired state is determined; and an actuation control step of shortening an actuation time until implementing the vehicle control for avoiding or mitigating the collision, in comparison with a time when the detection unit detects the object and the detection capability impaired state has not previously occurred, if the object is detected by the detection unit in which the detection capability impaired state has been eliminated within a predetermined time after determining that the detection capability impaired state has been eliminated, and not shortening the actuation time, if the object is not detected by the detection unit in which the detection capability impaired state has been eliminated within the predetermined time after the second determination unit determines that the detection capability impaired state has been eliminated.

* * * * *